US005132060A

United States Patent [19]

Stevens

[11] Patent Number: 5,132,060

[45] Date of Patent: Jul. 21, 1992

[54] METHODS OF MAKING ANTISTATIC VINYLAROMATIC-CONTAINING ARTICLES

[75] Inventor: Bradley D. Stevens, Frazeysburg, Ohio

[73] Assignee: The Dow Chemical Company, Midland, Mich.

[21] Appl. No.: 570,102

[22] Filed: Aug. 17, 1990

[51] Int. Cl.[5] .............................................. B29C 67/20

[52] U.S. Cl. .................................. 264/45.1; 264/45.4; 264/51; 427/377; 427/393.1; 427/393.5

[58] Field of Search ........................ 264/45.4, 51, 45.1; 427/393.1, 393.5, 377

[56] References Cited

U.S. PATENT DOCUMENTS

| | | | |
|---|---|---|---|
| 4,018,946 | 4/1977 | Klein . | |
| 4,020,133 | 4/1977 | Altares, Jr. . | |
| 4,115,605 | 9/1978 | Hultman et al. | 427/377 |
| 4,147,742 | 4/1979 | Castro et al. . | |
| 4,210,556 | 7/1980 | Castro et al. . | |
| 4,281,036 | 7/1981 | Leithauser et al. . | |
| 4,314,040 | 2/1982 | Castro et al. . | |
| 4,333,969 | 6/1982 | Wright et al. . | |
| 4,333,970 | 6/1982 | Blommers et al. . | |
| 4,369,227 | 1/1983 | Hahn et al. . | |
| 4,393,159 | 7/1983 | Lybrand . | |
| 4,393,176 | 7/1983 | Lybrand . | |
| 4,603,149 | 7/1986 | Kesling, Jr. et al. . | |
| 4,696,950 | 9/1987 | Cox . | |
| 4,743,476 | 5/1988 | Miller | 427/393.1 |
| 4,771,081 | 9/1988 | Cox . | |
| 4,785,032 | 11/1988 | Touhsaent . | |
| 4,808,448 | 2/1989 | Cox . | |

*Primary Examiner*—Jan H. Silbaugh
*Assistant Examiner*—Brian J. Eastley

[57] ABSTRACT

A method of making antistatic vinylaromatic polymer-containing articles, and articles produced thereby, which includes immersing expandable vinylaromatic polymer-containing articles, having a blowing agent dispersed therein, in a bath containing an ethoxylated amine compound for a length of time sufficient to allow the ethoxylated amine compound to penetrate into the expandable articles to an extent such that the expandable articles, when expanded to a density of at most about 1.5 pcf, dissipate an induced 5000 volt charge to substantially 0 volts in less than 2 seconds.

32 Claims, No Drawings

METHODS OF MAKING ANTISTATIC VINYLAROMATIC-CONTAINING ARTICLES

TECHNICAL FIELD

This invention relates generally to methods of making antistatic expandable and expanded vinylaromatic polymer-containing articles and the articles produced thereby.

BACKGROUND OF THE INVENTION

Current loose-fill packing materials, such as expanded polystyrene pellets, are well-known to acquire excessive static electricity, resulting in either being undesirably attracted to or repelled by surrounding objects. Common solutions to relieving the polystyrene pellets of static include either spraying or dipping pre-expanded or expanded polystyrene pellets with antistatic solutions to surface-treat the polystyrene pellets. However, with these methods, the antistatic durability is often inadequate because the coating can peel off, rub off, or be rinsed off the pellets. In addition, uniformity of coating is difficult to achieve, resulting in less than adequate static dissipative properties or higher costs of labor and materials to assure uniformity.

Another prior art method for relieving loose-fill packing materials of their static properties is by mixing an antistatic agent into the pellet material during extrusion. However, this method often results in undesirable nucleation or foaming of the product, reaction with fire retardants or other materials added to the pellet material, and/or poor static dissipative qualities.

Examples of previous attempts to solve the antistatic problem or related problems are described in the following patents:

U.S. Pat. No. 4,808,448 issued Feb. 28, 1989 to H.S. Cox discloses a process of combining an antistatic agent with thermoplastic beads to be pre-expanded in which the antistatic agent is combined in sufficient amounts either: (a) with thermoplastic beads to be expanded prior to injection into a pre-expander and thereafter injecting the combination of the thermoplastic beads and the antistatic agent into the preheated pre-expander for pre-expanding the beads; (b) with the beads in a preheater shortly after injection of the beads into the preheated pre-expander; or (c) in liquid form with dry steam for delivery to a molding cavity of a mold for intermixing with pre-expanded beads. If the antistatic agent to be combined with the bead is in liquid form and is to be mixed with the bead prior to being added to the heated pre-expander, the antistatic agent is mixed with the bead and thereafter the combination is heated to permit the expansion of the beads and atomizing of the liquid antistatic agent filling the space of the environment uniformly coating the expanding bead. Alternatively, if the antistatic agent is in liquid form, the liquid antistatic agent may also be injected into a heated environment separately from the bead wherein it atomizes, filling the environment, uniformly coating the expanding bead when added. Suitable antistatic agents disclosed include quaternized ethoxylated amines, for example, quaternized coconut amine ethoxylate. U.S. Pat. Nos. 4,696,950 and 4,771,081 to H.S. Cox are related to U.S. Pat. No. 4,808,448.

U.S. Pat. No. 4,785,032 issued Nov.15, 1988 to R.E. Touhsaent discloses a water-based antistatic coating composition comprising at least one water-soluble antistatic agent, which may be applied to a polymer film substrate and, upon drying, forms an adherent antistatic coating.

U.S. Pat. No. 4,603,149 issued Jul. 29, 1986 to H.S. Kesling, Jr. et al. discloses that dialkyl bisalkoxylated quaternary ammonium salts, when coated onto the surface of expandable styrene polymer particles, serve as an antistatic and anti-lumping agent for the particles. It is further disclosed that the ammonium salts may be coated onto the styrene polymer by any suitable method, such as dry blending in a mixer or solution coating followed by evaporation of the solvent. The patent teaches that certain quaternary salts may be added to the polymer particles during impregnation of the polymer with a blowing agent.

U.S. Pat. No. 4,393,176 issued Jul. 12, 1983 to W. Lybrand discloses adding chemical components to thermoplastic materials to reduce the electrical resistivity of the material. The chemical component or agent may be an amine when the thermoplastic material is a polystyrene or a modified styrene. The amine is preferably ethoxylated. It is disclosed that the material may be formed into sheets as by extrusion or may be injection molded into different members such as panels. The material may be formed by mixing the ethoxylated amine and the polystyrene and extruding the mixture.

U.S. Pat. No. 4,393,159 issued Jul. 12, 1983 to W. Lybrand discloses polypropylene articles in which the accumulation of static charges is inhibited by adding, e.g., ethoxylated amines to the polypropylene.

U.S. Pat. No. 4,369,227 issued Jan. 18, 1983 to K. Hahn et al. discloses particulate styrene polymers containing blowing agents which are surface-coated with a hydroxycarboxylic acid ester or an ester of a carboxylic acid with an oxyalkylated alcohol. The patent teaches that the esters are present predominantly as a uniformly distributed coating on the surface of the expandable polystyrene particles. The method of application of the coating is not critical; for example, simple tumbling of the finely divided ester with the styrene polymer particles in a commercial mixer may be used. It is also possible to apply the ester from a aqueous dispersion or a solution in an organic solvent, in which case the solvent or water must be removed during application. It is also possible to add the esters to the styrene bead polymerization charge at or towards the end of the suspension polymerization process.

U.S. Pat. No. 4,333,970 issued Jun. 8, 1982 to E.A. Blommers et al. discloses coated styrenic polymer beads which exhibit anti-lumping properties upon pre-expansion produced by forming a suspension of styrenic polymer beads in an aqueous medium and adding thereto, under polymerization conditions, an emulsion which contains a styrenic monomer and a catalyst therefor, and an isoprene or butadiene-styrene macromonomer, the emulsion formed in an aqueous medium containing a polyoxyethylene alkylphenol. The mixture so formed is maintained at an elevated temperature so as to form a polymerized coating about the initial styrenic beads. The beads, so produced, are then impregnated with an expanding agent.

U.S. Pat. No. 4,333,969 issued Jun. 8, 1982 to H.A. Wright et al. discloses a process for forming styrenic polymer beads having a preferred bead diameter from styrenic polymer beads having a smaller diameter which comprises forming a suspension of the small styrenic polymer beads in an aqueous medium with the aid of a finely divided, water-soluble inorganic phosphate suspending agent and a modifier therefor; forming an emulsion of styrenic monomer containing a free radical-producing catalyst in an aqueous medium, using a non-ionic surfactant that is an ethylene oxide condensate of an alkylphenol; and adding the styrenic monomer-catalyst aqueous emulsion to the styrenic polymer bead suspension in polymerizing the styrenic monomer about the styrenic beads.

U.S. Pat. No. 4,314,040 issued Feb. 2, 1982 to A.J. Castro et al. discloses a concentrated antistatic composition adapted for incorporation into various polymers such as olefins prepared by admixing a liquid ethoxylated amine antistatic agent, such as an N, N-bis-(2-hydroxyethyl) alkenyl or mixed alkenyl and alkyl amine, with various polymers such as, for example, polystyrene, heating to form a homogeneous liquid and rapidly cooling the mixture to form a solid antistatic agent. A normally liquid antistatic agent can thus be blended into a polymer such as polystyrene as a dry-solid product to impart antistatic properties to the blended resin. Examples of the amine antistatic agents are diethoxylated tallow (mixed alkenyl and alkyl) amine, and diethoxylated coco amine. U.S. Pat. No. 4,314,040 is a division of U.S. Pat. No. 4,210,556 which is a division of U.S. Pat. No. 4,147,742.

U.S. Pat. No. 4,281,036 issued Jul. 28, 1981 to H. Leithauser et al. discloses fine particulate expandable styrene polymers having coatings applied thereto by: (a) introducing the fine particulate expandable styrene polymers into a closed mixing vessel; (b) reducing the pressure in the mixing vessel below atmospheric; (c) preparing dispersions of the coating materials and heating the dispersions to about 30 to 90° C.; and (d) aspirating the heated dispersions of the coating materials into the mixing vessel while simultaneously mixing the dispersions with the particulate styrene polymers to form a coating thereon and drying the coated particles. The patent teaches that especially advantageous dispersions contain mixtures of monostearates and distearates of glycerin or the sorbitol ester of palmitic acid as the dispersing agents. Further, mixtures with dispersing agents of metallic soap such as magnesium zinc stearate or calcium stearate bisstearylethylenediamine are also used advantageously.

U.S. Pat. No. 4,020,133 issued Apr. 26, 1977 to T. Altares, Jr. discloses a collagen-aluminum complex which is dispersed in water, serving as a suspension agent for suspending polystyrene beads during impregnation of a blowing agent. The aqueous system is drained from the impregnated expandable beads, which are washed, but which retain adherent deposits of the collagen-aluminum complex. The dry coated beads are said to have minimized propensity toward lumping when pre-expanded.

U.S. Pat. No. 4,018,946 issued Apr. 19, 1977 to M. Klein discloses a method for producing expandable discrete styrene-polymer bit-pieces impregnated with a liquid aliphatic impregnant, wherein a quantity of styrene polymer bit-pieces are mixed in an aqueous solution with a quantity of the aliphatic impregnant sufficient to provide the desired extent of impregnation and a quantity of a compatible water-soluble emulsifying agent sufficient to emulsify the quantity of aliphatic impregnant in the aqueous solution. The patent teaches that suitable emulsifying agents may be any of the neutral soaps or synthetic wetting or dispersing agents such as are used as emulsifying agents in emulsion polymerization of styrene or any monomers used in preparing a styrenepolymer. Among these applicable emulsifying agents are sodium or potassium salts of fatty acids, anionic wetting agents such as sodium dodecyl sulfate, and cationic emulsifying agents such as quaternary ammonium salts.

It is, therefore, a primary object of the present invention to provide methods of making antistatic expandable and expanded vinylaromatic polymer-containing articles with significantly decreased propensity for acquiring static electricity, especially when the articles are expanded to substantially the maximum amount so that they may be used for inexpensive packing material.

It is also an object of the present invention to provide such methods that (1) are not deleterious to components in the articles, (2) provide a durable and uniform treatment, (3) are less costly in terms of materials and labor, (4) are easy to perform, and (5) avoid nucleation during extrusion of the unexpanded articles.

It is yet another object of the present invention to provide methods which provide good antistatic qualities to expanded vinylaromatic polymer-containing articles. One indication of good antistatic quality is when the expanded articles dissipate an induced 5000 volt charge to 0 volts in less than 2 seconds. It is also an object of the present invention to provide articles which are produced by such methods.

SUMMARY OF THE INVENTION

In accordance with a preferred embodiment of the invention, these and other objects and advantages are addressed as follows. A method of making an antistatic vinylaromatic polymer-containing article is disclosed which includes immersing an expandable vinylaromatic polymer-containing article, having a blowing agent dispersed therein, in a bath containing an ethoxylated amine compound for a length of time sufficient to allow the ethoxylated amine compound to penetrate into the expandable article to an extent such that the expandable article, when expanded to a bulk density of at most about 1.5 pcf (pound per cubic foot), dissipates an induced 5000 volt charge to substantially 0 volts in less than 2 seconds. Antistatic expandable and expanded vinylaromatic polymer-containing articles using this method are also disclosed.

DETAILED DESCRIPTION OF THE INVENTION

The methods of this invention begin with immersing an expandable vinylaromatic polymer-containing article, having a blowing agent dispersed therein, in a bath containing an ethoxylated amine compound. The vinylaromatic polymer-containing articles used in this invention are formed of vinylaromatic polymers which are solid at room temperature.

Vinylaromatic polymers suitable for this invention include homopolymers of vinylaromatic monomers, copolymers of two or more vinylaromatic monomers, and interpolymers of at least one vinylaromatic monomer and at least one nonvinylaromatic monomer which is interpolymerizable with vinylaromatic monomers. The preferred vinylaromatic monomers have the characteristic formula $CH_2{=}CX{-}Ar$, wherein X is hydrogen or an alkyl group having from 1 to 4 carbon atoms, and Ar is an aromatic radical, including various alkyl and halo-ring-substituted aromatic units of from 6 to 10 carbon atoms. Representative vinylaromatic monomers include styrene, o-methylstyrene, m-methylstyrene, p-methylstyrene, ethylstyrene, dimethylstyrene, alphamethylstyrene, p-methoxystyrene, alpha-methyl-p-methylstyrene, p-isopropylstyrene, vinylnapthalene, acetanapthalene, vinylanthracene, indene, p-cyanostyrene and the like.

Exemplary of nonvinyl aromatic polymers which can be polymerized with vinylaromatic monomers are unsaturated nitriles such as acrylonitrile, methylacrylonitrile, ethylacrylonitrile, and mixtures thereof. Other nonvinyl monomers which are copolymerizable with vinylaromatic monomers and which are suitable for use in the present invention are alpha/beta-unsaturated monobasic acids and derivatives thereof, such as acrylic acid, methacrylic acid, ethylacrylate, butylacrylate, 2-ethylhexylacrylate, methylmethacrylate, methacrylate, acrylamide, methacrylamide, maleic anhydride, N-phenylmaleimide, dimethylmaleate, diethylmaleate, dibutylmaleate, the corresponding fumarates and the like. Other suitable nonvinyl monomers include butadiene.

The vinylaromatic polymers may also include alloys which are a mixture of the aforementioned homopolymers, copolymers, and/or interpolymers optionally with a compatible polymer which contains none or a low amount of polymerized vinylaromatic monomer. These mixtures may be melt or pressure mixtures.

Currently, it is preferred that the vinylaromatic polymer, including the alloys, contain at least 50 weight % of at least one polymerized vinylaromatic monomer, with the balance being polymerized nonvinylaromatic monomer. It is more preferred that the vinylaromatic polymers contain at least 50 weight percent polymerized styrene monomer, with the balance being other polymerized vinylaromatic monomers and/or polymerized nonvinylaromatic monomers.

The shape and size of the vinylaromatic polymer-containing articles are not critical to the invention. The articles may be made, e.g., by (1) cutting extruded polymer in small lengths, (2) suspension polymerization, or (3) molding vinylaromatic polymer material. Examples of suitable shapes are cylindrical, flat, and "S"-shapes. Typical articles used for this invention are cylindrical and sized about $\frac{1}{4}$ inch in length and $\frac{1}{8}$ inch in diameter, i.e., a volume of about 0.003 cubic inches. Although smaller articles may be used in the invention, articles of about this size are preferred because they are easier to separate from the bath.

The vinylaromatic polymer-containing articles used in this invention contain a blowing agent dispersed therein. Blowing agents are typically liquid aliphatic impregnants which volatilize at a temperature below the polymers softening point and which are non-solvents for the polymer. The blowing agent may account for as much as about 15 weight % of the vinylaromatic polymer-containing article. Aliphatic impregnants include hydrocarbons and/or a halogenated hydrocarbons, such as hydrogenated chlorofluorohydrocarbons ("CFC's"). The hydrocarbons and halogenated hydrocarbons include those compounds having from 4 to 6 carbon atoms, such as in butane, pentane, cyclopentane, hexane, and cyclohexane.

To disperse a blowing agent in the vinylaromatic polymer-containing articles, basically the blowing agent may be infused in the vinylaromatic-containing material when molten. More specifically, the vinylaromatic polymer, the blowing agent, and other additives, which are usually used in less than one weight percent of the entire composition, are added to an extruder. The ingredients are melted and blended together in the extruder and forced out of the extruder die, cooled, for example, in a water bath, and cut. Examples of additives which may be used in the vinylaromatic polymer composition include additives such as fire retardants (e.g., hexabromocyclododecane or monopentabromochlorocyclohexane), lubricants (e.g., barium stearate, zinc stearate, or calcium stearate), sodium bicarbonate). Sources which describe techniques for incorporating the blowing agent into polymeric materials include U.S. Pat. Nos. 4,018,946 and 2,983,692 and the book, "Practical Polymerization of Polystyrene" by Bishop, published by Cahners (1971), which sources are hereby incorporated by reference.

To perform the method of the present invention, the vinylaromatic polymer-containing articles are immersed in a bath containing an ethoxylated amine compound. Preferably, the ethoxylated amine compound is suspended in a liquid medium, e.g., water. The ethoxylated amine compound is preferably suspended in an amount from about 0.7 to about 3 weight percent based on the weight of the bath. Amounts greater than about 3 weight percent are as effective, but are generally unnecessary. The types of ethoxylated amine compounds which are suitable for this invention include diethoxylated alkylamines, diethoxylated alkenylamines and mixtures thereof. Specific diethoxylated amines include diethoxylated tallow amine, diethoxylated coco amine, diethoxylated soya amine, and diethoxylated oleyl amine.

The temperature of the bath is typically from about 23° C. to about 70° C., and preferably from about 55° C. to about 65° C. If the bath is maintained at a temperature above room temperature, the expandable articles will often soften when immersed. The bath is preferably agitated throughout the immersion step to enhance the contact of the ethoxylated amine compound with the expandable article. It is desirable that the ratio of the weight of the bath to the expandable articles be at least about 7.5:1. One procedure for preparing the bath and immersing the expandable articles therein includes: (1) mixing the ethoxylated amine compound in the diluting liquid medium to form a uniform suspension, (2) heating the suspension to the desired temperature, while maintaining agitation, (3) placing the expandable articles in the suspension while maintaining the elevated temperature and agitation, and (4), after the desired length of time of immersion, removing the expandable articles from the suspension.

The expandable articles are immersed long enough to allow the ethoxylated amine compound to penetrate into and affix to the expandable article. By immersing the expandable articles for an extended length of time, the ethoxylated amine compound does not merely coat the expandable articles, but penetrates into the articles. When the treated expandable articles are thereafter expanded, it has been found that the ethoxylated amine compound continues to be detectable on much of the surface of the expanded articles. Generally, the expandable articles are immersed for a length of time sufficient to allow the ethoxylated amine compound to penetrate into the expandable article to an extent such that the expandable article, when expanded to a bulk density of at most about 1.5 pcf (pounds per cubic foot), dissipates an induced 5000 volt charge to substantially 0 volts in less than 2 seconds. Preferably, this level of dissipation occurs when the expandable article is expanded to a bulk density of at most about 1.0 pcf, and more preferably about 0.3 pcf. The expandable article, expanded to a bulk density of at most about 1.5 pcf, will desirably contain at least about 0.2, and more desirably, about 0.6 weight percent ethoxylated amine compound based on the weight of the expanded article in order to achieve such dissipation qualities. The immersion time required may vary with the size of the expandable article. Typical immersion times are from about 0.25 to about 3 hours, and more typically from about 0.5 to about 1.5 hours.

After the expandable articles have been immersed for a suitable length of they are removed from the bath and preferably dried. The drying is optional but substantially complete drying is preferred so that the expandable articles flow more easily. The drying may be completed, e.g., by simple air-drying or by circulating warm air around the treated expandable articles.

Once the expandable articles are removed from the bath and dried, if desired, the expandable articles are expanded to a bulk density of at most about 1.5 pcf. Additional expansions further decrease the bulk density of the expandable articles. The expansions may be done by exposing the expandable articles to atmospheric steam.

The expanded articles of this invention may be used as loose-fill packing material. The expandable articles may be used, for example, to make items such as cups and containers. Methods of making such cups and containers are well known in the art.

Thus, there is provided, in accordance with the present invention, methods of making antistatic expandable and expanded vinylaromatic polymer-containing articles, which methods (1) do not deleteriously effect components in the articles, (2) provide durable, uniform, and efficacious treatments, (3) are less costly than prior art methods, (4) are easy to perform, and (5) do not cause nucleation during extrusion of the unexpanded articles. Also provided in accordance with the invention are expandable and expanded vinylaromatic polymer-containing articles with good antistatic qualities.

The following examples are illustrative only and should not be construed as limiting the invention which is properly delineated in the appended claims.

In the following examples, the electrostatic properties of the materials were tested by a method modeled after the Federal Test Method (FTM) Standard 101C. The test determined the electrostatic properties of materials conditioned at less than 15% relative humidity by measuring the time required for complete dissipation of an induced charge. Electrostatic properties are defined as the ability of a material, when grounded, to dissipate a charge induced on the surface of the material. The difference between FTM 101C and the tests employed in these examples, is that the present examples tested the electrostatic property on pellets rather than on a sheet or a film. Other conditions of testing are discussed hereinbelow with reference to the specific examples.

The expandable vinylaromatic polymer-containing articles used in the examples were formed from a non-expanded material containing: (1) about 88 weight % polystyrene, (2) about 11 weight % blowing agent selected from pentane, CFC (chlorofluorohyirocarbon) 11, or mixtures thereof, and (3) less than or equal to about 1 weight % additives. The articles were in the shape of pellets which were slightly "S"-shaped having a diameter of about ⅛" and a length of about ¼".

EXAMPLES

Example 1

187.5 grams of Sherex "VARSTAT" K22 were added to 2312.5 grams of water in a 4000 ml beaker. "VARSTAT" K22 is an ethoxylated coco amine available from Sherex Chemical Company, Inc., Dublin, Ohio. The beaker was placed on a hot plate, and the materials were stirred and heated to about 65° C. 40 grams of expandable polystyrene pellets were placed in a small pouch made of #12 screening material, which has 1.68 millimeter openings. The pouch was immersed in the 65° C. bath and the temperature and agitation was maintained. After 45 minutes, the pouch was removed and the treated expandable polystyrene pellets were laid out to dry on paper towels. After 24 hours, the dried, treated, expandable polystyrene pellets were expanded by exposing the pellets to atmospheric steam for 2 minutes. After a 24-hour resting period at room temperature, the expansion was repeated using the expanded pellets. The twice-expanded pellets were expanded a third time using the same procedure. The thrice-expanded pellets had strong antistatic qualities as they dissipated an induced 5000 volt charge to 0 volts in less than 2 seconds using the test described above.

Examples 2 through 12

These examples used a water bath containing "VARSTAT" K-22 (described in Example 1) and varied the suspension concentration, the immersion time, and the water bath temperature. Table 1 provides the concentration of the ethoxylated amine in the bath, the immersion time, and the bath temperature for each example.

TABLE 1

| Example # | Concentration[a] in bath (wt %) | Immersion time (min.) | Bath Temp. (°C.) |
|---|---|---|---|
| 2 | 4.5 | 97.5 | 45 |
| 3 | 3 | 15 | 24 |
| 4 | 3 | 180 | 24 |
| 5 | 3 | 15 | 66 |
| 6 | 3 | 180 | 66 |
| 7 | 4.5 | 97.5 | 45 |
| 8 | 6 | 15 | 24 |
| 9 | 6 | 180 | 24 |
| 10 | 6 | 15 | 66 |
| 11 | 6 | 180 | 66 |
| 12 | 4.5 | 97.5 | 45 |

[a]concentration of diethyoxylated coco amine in water bath.

For the examples with 3 weight % concentration suspensions, 75 grams of the diethoxlated coco amine were mixed in 2425 grams of distilled water for the examples with 4.5 weight % concentration suspensions, 112.5 grams of diethoxylated coco amine were mixed into 2387.5 grams of distilled water. For the examples with 6 weight % concentration suspensions, 150 grams of diethoxylated coco amine were mixed in 2350 grams of distilled water. Only one 3 weight % and one 6 weight % concentration suspension was made and re-used for the appropriate examples. With the 4.5 weight % concentration suspension, a new 2500 gram bath was generated for each appropriate example.

For examples 2 through 12, the suspensions were placed on a hot plate and agitated with a stir bar. Expandable polystyrene pellets were placed in screen pouches and immersed in the suspensions for the time specified in Table 1. After the specified immersion time, the treated expandable polystyrene pellets were placed immediately on a paper towel to dry. The pellets were dried for 24 hours in ambient conditions. Examples 5 and 6 were run after the bath temperature had reached 81° C. overnight and returned to 66° during treatment.

The treated expandable polystyrene pellets were then expanded with atmospheric steam for 2 minutes. The bulk densities of the once-expanded polystyrene pellets were measured and ranged from 0.95 to 1.00 pcf. The expanded polystyrene pellets were then aged or rested for 48 hours at 78° F. with a relative humidity of 9% and were then tested for electrostatic dissipation. Table 2 provides the bulk density of each of the Examples 2 through 12 and the average decay times in seconds, both from a positive 5000 volt charge as well as from a negative 5000 volt charge. All of the Examples 2 through 12 dissipated a 5000 volt charge in less than 2 seconds.

TABLE 2

| Example # | Bulk Density (pcf) | Avg. Decay Time[a] From +5000 V (sec) | Avg. Decay Time[a] From −5000 V (sec) |
|---|---|---|---|
| 2 | 0.95 | 0.09 | 0.09 |
| 3 | 0.97 | 0.80 | 0.86 |
| 4 | 0.95 | 1.32 | 1.42 |
| 5 | 1.00 | 0.10 | 0.13 |
| 6 | 0.95 | 0.11 | 0.11 |
| 7 | 0.98 | 0.09 | 0.10 |
| 8 | 0.99 | 0.10 | 0.10 |
| 9 | 0.98 | 0.07 | 0.07 |
| 10 | 0.98 | 0.08 | 0.09 |
| 11 | 0.99 | 0.08 | 0.08 |
| 12 | 1.00 | 0.14 | 0.14 |

[a]average determined from three measurements

The once-expanded polystyrene pelles were then expanded again with atmospheric steam and aged for about 48 hours at 78° F. with a relative humidity of 9.2%. The bulk density of the once-expanded pellets, the average decay time from +5000 volts and the average decay time from −5000 volts are provided in Table 3.

TABLE 3

| Example # | Bulk Density (pcf) | Avg. Decay Time[a] From +5000 V (sec) | Avg. Decay Time[a] From −5000 V (sec) |
|---|---|---|---|
| 2 | 0.47 | 0.21 | 0.22 |
| 3 | 0.46 | 30+[b] | 30+ |
| 4 | 0.44 | 30+ | 30+ |
| 5 | 0.51 | 0.64 | 0.69 |
| 6 | 0.48 | 0.45 | 0.42 |
| 7 | 0.49 | 0.25 | 0.26 |
| 8 | 0.49 | 0.55 | 0.59 |
| 9 | 0.50 | 0.19 | 0.20 |
| 10 | 0.47 | 0.43 | 0.64 |
| 11 | 0.50 | 0.23 | 0.24 |
| 12 | 0.49 | 0.65 | 0.68 |

[a]average determined from three measurements
[b]greater than 30 seconds

The twice-expanded polystyrene pellets were then expanded yet again using atmospheric steam and aged for 96 hours at 79° F. with a relative humidity of 9.8%. The thrice-expanded polystyrene pellets were then tested for charge dissipation. The bulk densities, the average decay times from +5000 volts and the average decay times from −5000 volts are given in Table 4 for the thrice-expanded polystyrene pellets.

TABLE 4

| Example # | Bulk Density (pcf) | Avg. Decay Time[a] From +5000 V (sec) | Avg. Decay Time[a] From −5000 V (sec) |
|---|---|---|---|
| 2 | 0.28 | 0.23 | 0.30 |
| 3 | ND[b] | 30+[c] | 30+ |
| 4 | ND | 30+ | 30+ |
| 5 | 0.32 | 1.02 | 1.27 |
| 6 | 0.33 | 0.39 | 0.38 |
| 7 | 0.29 | 0.29 | 0.28 |
| 8 | 0.28 | 0.33 | 0.36 |
| 9 | 0.31 | 0.20 | 0.22 |
| 10 | 0.30 | 0.44 | 0.44 |
| 11 | 0.33 | 0.26 | 0.29 |
| 12 | 0.31 | 3.06 | 3.83 |

[a]average determined from three measurements
[b]not determined
[c]greater than 30 seconds

Examples 13 through 18

For examples 13–18, the procedure as described for Examples 2 through 12 was repeated with the following differences. Examples 13–18 employed "KEMAMINE" AS 989, an ethoxlated tallow amine, as the ethoxylated amine compound and varied the suspension concentration and the immersion time. "KEMAMINE" is a trademark of the Witco Chemical Corporation, New York, N.Y. For each of Examples 13 through 18, a new water bath suspension was prepared, based on a total bath weight of 800 grams. The bath temperature was maintained at 60° C. For each example, 75 grams of the expandable polystyrene pellets were immersed in the water bath suspension. For these examples, a THERMOMIX 441 heater-circulator, Type 850123, from B. Braun, W. Germany and a 1000 ml beaker constituted the apparati. The various bath concentrations and immersion times are provided in Table 5 for each example. After treatment and drying, the expandable polystyrene pellets were expanded three times using atmospheric steam. For each example, the bulk densities of the expanded polystyrene pellets were measured. Results after one expansion are provided in Table 6, the results after two expansions are provided in Table 7, and the results after three expansions are provided in Table 8. Tests on the once-expanded and twice-expanded pellets were conducted after 24 hours of aging at conditions of 9.5% relative humidity and about 78° F. Tests on the thrice-expanded pellets were conducted after 48 hours of aging at conditions of less than 15% relative humidity and about 78° F.

TABLE 5

| Example # | Concentration[a] In Bath (wt %) | Immersion Time (min.) |
|---|---|---|
| 13 | 2.75 | 72.5 |
| 14 | 4.5 | 100 |
| 15 | 1.0 | 45 |
| 16 | 2.75 | 72.5 |
| 17 | 1.0 | 100 |
| 18 | 4.5 | 45 |

[a]concentration of diethoxylated tallow amine in water bath

TABLE 6

| Example # | Bulk Density (pcf) | Avg. Decay Time[a] From + and −5000 V (sec) |
|---|---|---|
| 13 | 0.97 | 0.37 |
| 14 | 0.99 | 0.49 |
| 15 | 0.95 | 0.33 |

TABLE 6-continued

| Example # | Bulk Density (pcf) | Avg. Decay Time[a] From + and −5000 V (sec) |
|---|---|---|
| 16 | 0.97 | 0.55 |
| 17 | 0.97 | 0.65 |
| 18 | 0.96 | 0.44 |

[a]Average of three measurements from +5000 V and three measurements from −5000 V

TABLE 7

| Example # | Bulk Density (pcf) | Avg. Decay Time[a] From + and −5000 V (sec) |
|---|---|---|
| 13 | 0.48 | 0.49 |
| 14 | 0.50 | 0.62 |
| 15 | 0.48 | 0.45 |
| 16 | 0.49 | 0.78 |
| 17 | 0.48 | 0.41 |
| 18 | 0.50 | 0.55 |

[a]Average of three measurements from +5000 V and three measurements form −5000 V

TABLE 8

| Example # | Bulk Density (pcf) | Avg. Decay Time[a] From + and −5000 V (sec) |
|---|---|---|
| 13 | 0.28 | 0.23 |
| 14 | 0.29 | 0.18 |
| 15 | 0.29 | 0.17 |
| 16 | 0.28 | 0.22 |
| 17 | 0.28 | 0.46 |
| 18 | 0.29 | 0.19 |

[a]Average of three measurements from +5000 V and three measurements from −5000 V Example 19

Unexpanded polystyrene pellets were treated with the previously-described ethoxylated tallow amine, "KEMAMINE" AS 989, according to the invention. Eight sets of treated pellets were prepared. Four of the eight sets were expanded with atmospheric steam once. A sample of the once-expanded pellets had an average static decay time of 0.15 seconds, averaged from three decay times measured from +5000 volts and three decay times measured from −5000 volts. The level of ethoxylated tallow amine in the once-expanded pellets was measured by gas chromatography in four separate samples. Results indicated levels of ethoxylated tallow amine of 0.30, 0.40, 0.31, and 0.31 weight % based on the weight of the expanded pellets.

The other four of the eight sets were expanded with atmospheric steam three times. A sample of the thrice-expanded pellets had an average static decay time of 0.21 seconds, averaged from three decay times measured from +5000 volts and three decay times from −5000 volts. The level of ethoxylated tallow amine in the thrice-expanded pellets was measured by gas chromatography in four separate samples. Results indicated levels of ethoxylated tallow amine of 0.24, 0.26, 0.39, and 0.34 weight % based on the weight of the expanded pellets.

Examples 20–21

Unexpanded polystyrene pellets were treated by immersing the pellets in a water bath containing 4.5 weight % of the previously-described ethoxylated coco amine, "VARSTAT" K22. Two sets of the treated polystyrene pellets were expanded three times. Table 9 provides the bulk densities, the average static decay times, and the average weight % ethoxylated coco amine in the expanded pellets determined by gas chromatography.

TABLE 9

| Example # | Bulk Density (pcf) | Avg. Decay Time (sec) | Avg. Weight % Amine Compound[a] |
|---|---|---|---|
| 20 | 0.25 | 0.68[b] | 0.68 |
| 21 | 0.33 | 0.20[c] | 0.68 |

[a]average of two measurements
[b]average of nine decay times from −5000 volts and nine decay times from +5000 volts
[c]average of three decay times from −5000 volts and three decay times from +5000 volts While my invention has been described in terms of a specific embodiment, it must be appreciated that other embodiments could readily be adapted by one skilled in the art. Accordingly, the scope of my invention is to be limited only by the following claims.

What is claimed is:

1. A method of making an antistatic non-expanded expandable vinylaromatic polymer-containing article, comprising:
   immersing a non-expanded expandable vinylaromatic polymer-containing article, having a blowing agent dispersed therein, in a bath containing an ethoxylated amine compound for a length of time sufficient to allow the ethoxylated amine compound to penetrate into the non-expanded expandable article, when expanded to a bulk density of at most about 1.5 pcf, dissipates an induced 5000 volt charge to substantially 0 volts in less than 2 seconds removing and drying the non-expanded expandable article.

2. The method of claim 1, wherein, after immersing, the expandable article, expanded to a bulk density of at most about 1.5 pcf, contains at least about 0.2 weight percent ethoxylated amine compound based on the weight of the expanded article.

3. The method of claim 1, wherein, after immersing, the expandable article, expanded to a bulk density of at most about 1.5 pcf, contains at least about 0.6 weight percent ethoxylated amine compound based on the weight of the expanded article.

4. The method of claim 1, wherein the bath contains the ethoxylated amine compound suspended in water.

5. The method of claim 1, wherein the bath contains at least about 0.7 weight percent ethoxylated amine compound based on the weight of the bath.

6. The method of claim 1, wherein the bath contains from about 0.7 to about 3 weight percent ethoxylated amine compound based on the weight of the bath.

7. The method of claim 1, wherein the ethoxylated amine compound is selected from the group consisting of diethoxylated alkyl amines, diethoxylated alkenyl amines, and mixtures thereof.

8. The method of claim 1, wherein the ethoxylated amine compound is selected from the group consisting of diethoxylated tallow amine, diethoxylated coco amine, diethoxylated soya amine, diethoxylated oleyl amine, and mixtures thereof.

9. The method of claim 1, wherein the length of time sufficient to penetrate into the expandable article is from about 0.25 to about 3 hours.

10. The method of claim 1, wherein the expandable article, when expanded to a bulk density of at most about 1.0 pcf, dissipates an induced 5000 volt charge to substantially 0 volts in less than 2 seconds.

11. The method of claim 1, wherein the expandable article, when expanded to a bulk density of at most about 0.3 pcf, dissipates an induced 5000 volt charge to substantially 0 volts in less than 2 seconds.

12. The method of claim 1, wherein the expandable article, excluding the blowing agent, contains at least about 50 mole percent polymerized styrene monomer.

13. The method of claim 1, wherein the expandable article, excluding the blowing agent, is composed substantially entirely of polystyrene.

14. The method of claim 1, wherein the weight ratio of the bath to the expandable article is at least about 7.5:1.

15. The method of claim 1, wherein the bath is maintained at a temperature from about 23 to about 70° C. during the immersing step.

16. The method of claim 1, wherein the bath is maintained at a temperature from about 55 to about 65° C. during the immersing step.

17. A method of making an expanded vinylaromatic polymer-containing article which is substantially static-free, comprising:

(a) immersing an non-expanded expandable vinylaromatic polymer-containing article, having a blowing agent dispersed therein, in a bath containing an ethoxylated amine compound for a length of time sufficient to allow the ethoxylated amine compound to penetrate into the non-expanded expandable article to an extent such that the non-expanded expandable article, when expanded to a bulk density of at most about 1.5 pcf, dissipates an induced 5000 volt charge to substantially 0 volts in less than 2 seconds, (b) removing the non-expanded expandable article from the bath, and (c) drying and expanding the removed non-expanded expandable article to at most about 1.5 pcf.

18. The method of claim 17, wherein the expanded article contains at least about 0.2 weight percent ethoxylated amine compound based on the weight of the expanded article.

19. The method of claim 17, wherein the expanded article contains at least about 0.6 weight percent ethoxylated amine compound based on the weight of the expanded article.

20. The method of claim 17, wherein the bath contains the ethoxylated amine compound suspended in water.

21. The method of claim 17 wherein the bath contains at least about 0.7 weight percent ethoxylated amine compound based on the weight of the bath.

22. The method of claim 17, wherein the bath contains from about 0.7 to about 3 weight percent ethoxylated amine compound based on the weight of the bath.

23. The method of claim 17, wherein the expanding step is accomplished by exposing the removed expandable article to steam.

24. The method of claim 17, wherein the ethoxylated amine compound is selected from the group consisting of diethoxylated alkyl amines, diethoxylated alkenyl amines, and mixtures thereof.

25. The method of claim 17, wherein the ethoxylated amine compound is selected from the group consisting of diethoxylated tallow amine, diethoxylated coco amine, diethoxylated soya amine, diethoxylated oleyl amine, and mixtures thereof.

26. The method of claim 17, wherein the length of time sufficient to penetrate into the expandable article is from about 0.25 to about 3 hours.

27. The method of claim 17, wherein the expandable article, when expanded to a bulk density of at most about 1.0 pcf, dissipates an induced 5000 volt charge to substantially 0 volts in less than 2 seconds.

28. The method of claim 17, wherein the expandable article, when expanded to a bulk density of at most about 0.3 pcf, dissipates an induced 5000 volt charge to substantially 0 volts in less than 2 seconds.

29. The method of claim 17, wherein the expandable article, excluding the blowing agent, contains at least about 50 mole percent polymerized styrene monomer.

30. The method of claim 17, wherein the expandable article, excluding the blowing agent, is composed substantially entirely of polystyrene.

31. The method of claim 17, wherein the weight ratio of the bath to the expandable article is at least about 7.5:1.

32. The method of claim 17, wherein the bath is maintained at a temperature from about 23 to about 70° C. during the immersing step.

* * * * *

UNITED STATES PATENT AND TRADEMARK OFFICE

CERTIFICATE OF CORRECTION

PATENT NO. : 5,132,060

DATED : July 21, 1992

INVENTOR(S) : Bradley D. Stevens

It is certified that error appears in the above-identified patent and that said Letters Patent is hereby corrected as shown below:

In the Claims, column 12, line 31 after the word article, insert --to an extent such that the non-expanded expandable article, --.

Signed and Sealed this

Twenty-sixth Day of October, 1993

*Attest:*

BRUCE LEHMAN

*Attesting Officer*

*Commissioner of Patents and Trademarks*